United States Patent [19]

Bumbarger

[11] Patent Number: 5,134,703
[45] Date of Patent: Jul. 28, 1992

[54] EXTERNAL CLOCK UNIT FOR A COMPUTER

[75] Inventor: Daniel L. Bumbarger, Hudson, Mass.

[73] Assignee: Nemonix, Inc., Hopkinton, Mass.

[21] Appl. No.: 536,436

[22] Filed: Jun. 11, 1990

[51] Int. Cl.[5] .............................................. G06F 1/04
[52] U.S. Cl. ............................ 395/550; 364/DIG. 2; 364/934
[58] Field of Search ... 364/200 MS File, 900 MS File, 364/DIG. 1, DIG. 2; 307/269; 331/46; 328/59; 395/550

[56] References Cited

U.S. PATENT DOCUMENTS

| | | | |
|---|---|---|---|
| 4,191,998 | 3/1980 | Carmody | 364/200 |
| 4,217,637 | 8/1980 | Faulkner et al. | 364/200 |
| 4,322,580 | 3/1982 | Khan et al. | 364/900 |
| 4,408,272 | 10/1983 | Walters | 364/200 |
| 4,438,490 | 3/1984 | Wilder, Jr. | 364/200 |
| 4,458,308 | 7/1984 | Holtey et al. | 364/200 |
| 4,481,581 | 11/1984 | Johnson | 364/200 |
| 4,586,159 | 4/1986 | Thomas et al. | 364/900 |
| 4,636,656 | 1/1987 | Snowden et al. | 364/900 |
| 4,648,102 | 3/1987 | Riso et al. | 364/900 |
| 4,722,070 | 1/1988 | Dye | 364/900 |
| 4,853,653 | 8/1989 | Maher | 331/49 |

*Primary Examiner*—Eddie P. Chan
*Attorney, Agent, or Firm*—Kriegsman & Kriegsman

[57] ABSTRACT

An external clock unit for use in increasing the clock cycle time in a DEC 8000 series computer without making any hardware changes inside the computer includes a first crystal oscillator for generating a first clock signal 160.2 MHZ, a second crystal oscillator for generating a second clock signal, a multiplexor for receiving said first clock signal and said second clock signal and outputting one of said clock signals, a first line driver for driving the clock signal of 157.53 MHZ outputted by the multiplexor, a second line driver for outputting a clock enable signal, a toggle switch for turning on the clock enable signal and a power supply for providing power to said first crystal oscillator, said second crystal oscillator, said multiplexor and said first and second line drivers. In use, the accelerator is connected to the clock module in the computer through pins in the backplane. When the clock enable signal is turned on, the internal clock in the computer which is coupled to the clock module and which is 133 MHZ is disabled and the clock signal from the external clock unit is fed in to the clock module and used as the clock signal for the computer.

3 Claims, 1 Drawing Sheet

EXTERNAL CLOCK UNIT FOR A COMPUTER

BACKGROUND OF THE INVENTION

The present invention relates generally to an external clock unit for use in increasing the operating speed of a computer and more particularly to an external clock unit for use in increasing the operating speed of a Digital Equipment Corporation 8000 series computer without making any hardware changes inside the computer.

SUMMARY OF THE INVENTION

An external clock unit for a DEC 8000 series computer constructed according to the teachings of the present invention comprises a first crystal oscillator for generating a first clock signal, a second crystal oscillator for generating a second clock signal, a multiplexor for receiving said first clock signal and said second clock signal and outputting one of said clock signals, a first line driver for driving the clock signal outputted by the multiplexor, a second line driver for driving a clock enable signal, and power supply means for providing power to said first crystal oscillator, said second crystal oscillator, said multiplexor and said first and second line drivers.

Various features and advantages will appear from the description to follow. In the description, reference is made to the accompanying drawings which forms a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore not to be taken in a limiting sense, and the scope of the present invention is best defined by the appended claims.

BRIEF DESCRIPTION OF THE DRAWINGS

In the drawings wherein like reference numerals represent like parts

DETAILED DESCRIPTION OF PREFERRED EMBODIMENTS

Figure 1:
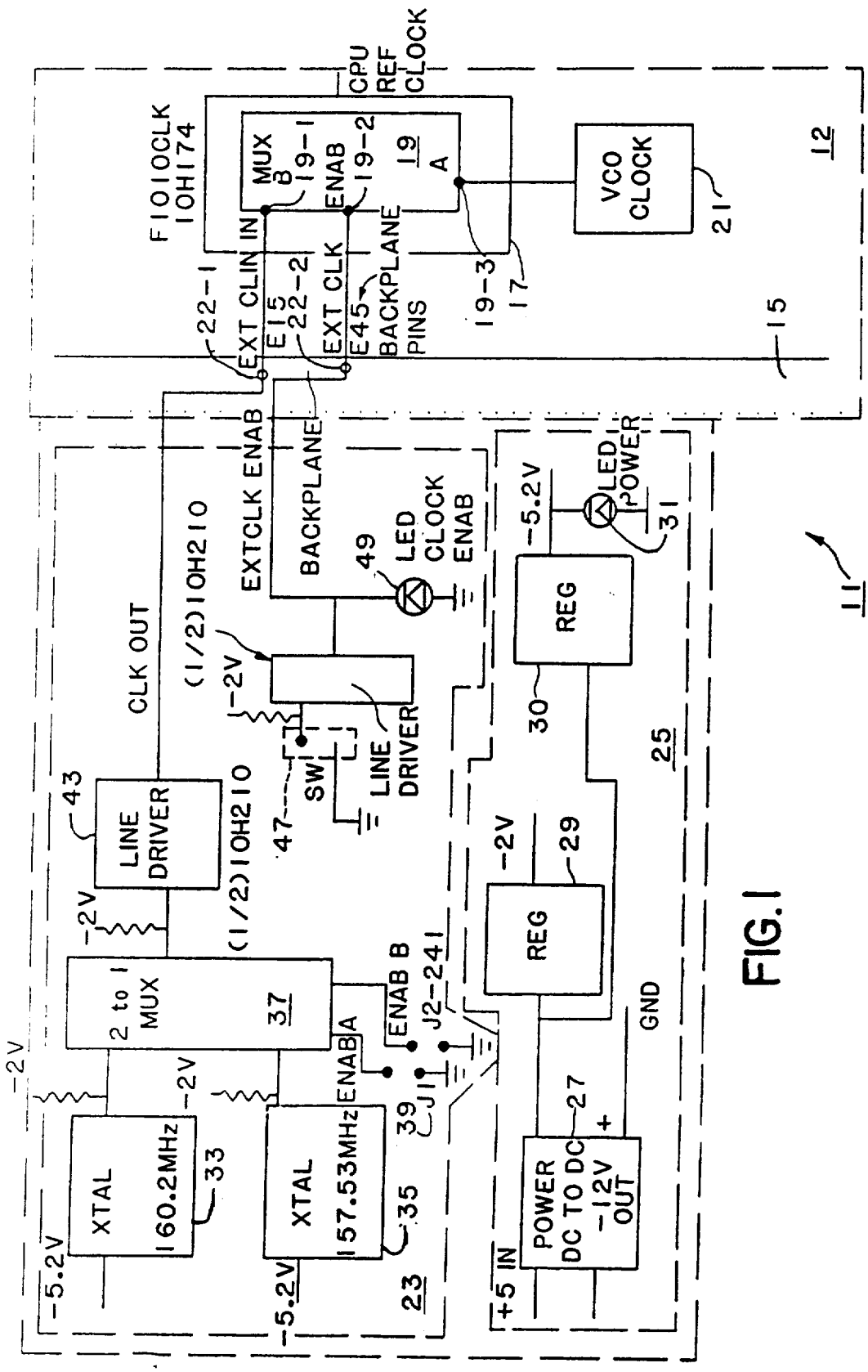
FIG. 1 is a block diagram of an external clock unit constructed according to the teachings of the present invention and connected to a computer.

Referring now to the drawings, there is shown in FIG. 1 an external clock unit constructed according to the teachings of the present invention and identified generally by reference numeral 11. Also shown in FIG. 1 is a portion of a DEC 8000 series computer 12.

The portion shown of computer 12 includes a backplane 15 and an F1010 clock module 17. Module 17 includes a 10H174 multiplexor 19. A 133 MHZ VCO (internal) clock 21 is coupled to module 17. Multiplexor 19 has a pair of inputs 19-1 and 19-2 which are connected to pins 22-1 (i.e. E15) and 22-2 (i.e. E45) respectively in backplane 15 and an input 19-3. Pins 22-1 and 22-2 are normally used only during fabrication of the clock module. More specifically, these two pins are used to enable the assembly person to apply a variable clock signal and an external clock enable signal to the multiplexor clock module for test purposes. The output clock signal from clock module 17 is over line 22-3 and is sent to the CPU (not shown) in computer 12. Other parts of computer 12 not pertinent to this invention are not shown.

An external clock unit 11 includes an operating section 23 for generating clock signals and a power supply section 25 for providing power to operating section 23.

Power supply section 25 includes a DC to DC power converter 27 which receives a +5 volt input from a pair of pins (not shown) on backplane 15 of computer 12 and produces a −12 volt output. The −12 volt output is fed into a −2 volt regulator 29 which produces a constant −2 volt output and a −5.2 volt regulator which produces a constant −5.2 volt output. An LED 31 is coupled to the −5.2 v output line and is used to indicate if the power section is on.

Operating section 23 includes a 160.2 MHZ crystal oscillator 33 and a 157.33 MHZ crystal oscillator 35. Crystal oscillator 33 is used to provide a clock signal for computer 12 while crystal oscillator 35 is used for maintenance purposes.

The output signals from crystal oscillators 33 and 35 are applied to a 2 to 1 multiplexor 37 which selects which oscillator signal is to be outputted. When a first jumper 39 is connected to ground the signal from crystal oscillator 33 is outputted and when a second jumper 41 is connected to ground the signal from crystal oscillator 35 is outputted.

The output signal from multiplexor 37 is driven by a driver 43 into input 19-1 of multiplexor 19 through pin 22-1 in backplane 15. An external clock enable signal is driven by a driver 45 into input 19-2 of multiplexor 19 through pin 22-2 in backplane 15. Driver 45 is turned "on" or "off" by a manually operated toggle switch 47. An LED 49 indicates when driver 45 is in the "on" position.

In the absence of an external clock enable signal at pin 22-2, from driver 45, multiplexor 19 outputs the 133 MHZ signal from clock 21. On the other hand, when an external clock enable signal is received from driver 45 at pin-22, the signal from clock 21 is disabled and multiplexor 219 outputs the EXT CLIN IN signal received from line driver 43 from pin 22-1.

The software necessary to run the computer using the MHZ clock is as follows:

$STOP/CPU
$SPEED=12000
$RUN SYS$SYSROOT: [SYSMGR.CACHE]SETUP CLOCK REG. EXE
$START/CPU

The embodiments of the present invention is intended to be merely exemplary and those skilled in the art shall be able to make numerous variations and modifications to it without departing from the spirit of the present invention. All such variations and modifications are intended to be without the scope of the present invention as defined in the appended claims.

What is claimed is:

1. A computer system comprising:
   a. a DEC 8000 series computer, said DEC 8000 series computer including:
      i. a CPU,
      ii. a clock module for outputting a clock signal to said CPU, said clock module including a multiplexor having an A input, a B input and a control signal input, iii. a 133 MHZ internal clock coupled to said A input in said multiplexor in said clock module, and iv. a backplane, said backplane having a first pin connected to said B input in said multiplexor in said clock module and a second pin connected to said control signal input in said multiplexor in said clock module, said first and second pins normally being used only for test purposes during fabrication of the clock module to apply a variable clock signal and an external clock enable signal to said multiplexor in said clock module, b. an external clock unit operating independent of said CPU, said external clock unit comprising:

i. a 160.2 MHZ crystal oscillator for generating a first external clock signal, ii. a 157.53 MHZ crystal oscillator for generating a second external clock signal, iii. a multiplexor for receiving said first external clock signal and said second external clock signal and outputting one of said first and second external clock signals, iv. a first line driver coupled between said multiplexor in said external clock unit and said first pin in said backplane for driving said one of said external clock signals outputted by said multiplexor in said external clock unit to said first pin in said backplane, v. means coupled to said second pin in said backplane for providing an external clock enable signal to said multiplexor in said clock module, said means including a manually operable switch for turning on and off said external clock enable signal and a second line driver for driving said external clock enable signal, vi. first and second pairs of jumper pins coupled to said multiplexor in said external clock unit for setting which external clock signal is outputted by said multiplexor in said external clock unit, and vii. power supply means for providing power to said 160.2 MHZ crystal oscillator, said 157.53 MHZ crystal oscillator, said multiplexor in said external clock unit and said first and second line drivers.

2. The external clock unit of claim 1 and wherein said power supply means comprises a DC to DC power converter for converting +5 volts to −12 volts and a pair of regulators coupled to said DC to DC power converter for outputting a constant −2 volts and a constant −5.2 volts.

3. The external clock unit of claim 2 and further including a first LED for indicating if said power supply means is on and a second LED for indicating if said manually operable switch is on.

* * * * *